United States Patent
Prabhakar et al.

(10) Patent No.: US 11,546,805 B2
(45) Date of Patent: Jan. 3, 2023

(54) TIME SENSITIVE COMMUNICATIONS BETWEEN USER EQUIPMENT

(71) Applicant: Apple Inc., Cupertino, CA (US)

(72) Inventors: Alosious Pradeep Prabhakar, Singapore (SG); Han Pu, Hong Kong (HK); Krisztian Kiss, Hayward, CA (US); Mohammed Sadique, Auburn (AU); Rohit R. Matolia, Surat (IN); Srinivasan Nimmala, San Jose, CA (US); Sriram Subramanian, San Jose, CA (US); Vijay Venkataraman, San Jose, CA (US); Wei Zhang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 58 days.

(21) Appl. No.: 17/302,520

(22) Filed: May 5, 2021

(65) Prior Publication Data
US 2021/0352536 A1    Nov. 11, 2021

(30) Foreign Application Priority Data

May 5, 2020    (IN) .............................. 202041019173

(51) Int. Cl.
*H04W 28/24*    (2009.01)
*H04W 76/14*    (2018.01)
(Continued)

(52) U.S. Cl.
CPC .......... *H04W 28/24* (2013.01); *H04W 24/08* (2013.01); *H04W 28/0268* (2013.01); *H04W 76/14* (2018.02)

(58) Field of Classification Search
CPC . H04L 47/2416; H04L 47/28; H04L 43/0852; H04W 76/14; H04W 76/12;
(Continued)

(56) References Cited

U.S. PATENT DOCUMENTS

2018/0139131 A1*   5/2018   Ignatchenko ........... H04L 43/10
2018/0316557 A1*   11/2018  Frangieh ................. H04L 67/34
(Continued)

OTHER PUBLICATIONS

"3rd Generation Partnership Project: Technical Specification Group Services and System Apsects: Study on enhanced support of Industrial Internet of Things (IIoT) in 5G System, (Release 17)", Jan. 28, 2020, 33 sheets.
(Continued)

*Primary Examiner* — Syed Ali
(74) *Attorney, Agent, or Firm* — Fay Kaplun & Marcin, LLP (57) ABSTRACT

Disclosed are systems, methods, integrated circuits and computer readable storage media for configuring time sensitive communications (TSC). The configuring of the TSC includes monitoring, by a user plane function (UPF), a source and destination of packets in a first protocol data unit (PDU) session of a first user equipment (UE) and in a second PDU session of a second UE, pairing a first device side TSN translator (DS-TT) port of the first UE with a second DS-TT port of the second UE when the first PDU session and the second PDU session are served by the same UPF, wherein the pairing is based on the monitoring of the first and second PDU sessions and when the first DS-TT and second DS-TT ports are paired, communicating the packets between the first UE and the second UE in a UE-UE communication without traversing the TSN.

20 Claims, 9 Drawing Sheets

(51) Int. Cl.
*H04W 24/08* (2009.01)
*H04W 28/02* (2009.01)

(58) Field of Classification Search
CPC . H04W 24/08; H04W 40/24; H04W 28/0268; H04W 28/24
See application file for complete search history.

(56) References Cited

U.S. PATENT DOCUMENTS

| | | |
|---|---|---|
| 2020/0007269 A1* | 1/2020 | Uhling .................. H04L 1/0036 |
| 2020/0137615 A1* | 4/2020 | Joseph .................. H04W 24/02 |
| 2020/0229055 A1* | 7/2020 | Chien ............... H04W 36/0033 |
| 2020/0389380 A1* | 12/2020 | Huddleston ........ H04B 17/3912 |
| 2021/0007160 A1* | 1/2021 | Sivasiva Ganesan ...................... H04W 28/0268 |
| 2021/0204172 A1* | 7/2021 | Rost .................... H04L 41/5009 |
| 2021/0243641 A1* | 8/2021 | Gangakhedkar .... H04L 47/2475 |
| 2021/0243771 A1* | 8/2021 | Mannweiler ...... H04W 28/0268 |
| 2022/0095153 A1* | 3/2022 | Ha .................... H04W 28/0268 |
| 2022/0255871 A1* | 8/2022 | Rost ........................ H04L 65/80 |
| 2022/0263743 A1* | 8/2022 | Gebert .................. H04W 24/08 |

OTHER PUBLICATIONS

"3rd Generation Partnership Project; Technical Specification Group Services and System Aspects; System Architecture for the 5G System (5GS); State 2 (Release 16)", Mar. 23, 2020, 22 sheets.
ZTE et al., "Clarification on the bridge model", 3GPP; S2003032RO7; Apr. 22, 2020, 6 sheets.

* cited by examiner

TIME SENSITIVE COMMUNICATIONS BETWEEN USER EQUIPMENT

BACKGROUND

In industrial internet of things (IIoT) applications, various UEs transmit and receive time sensitive communications (TSC) to/from one another. These communications are typically performed via a time sensitive networking (TSN) network. The UEs may include industrial devices/machinery that are networked together. This connectivity allows for data collection, exchange, analysis, and/or control over the various UEs. To facilitate communication from a first UE to a second UE, a TSN bridge is established between each UE and the TSN network. The data packet(s) are then transmitted over the TSN bridge on the transmission side from the first UE to the TSN network and then received over the TSN bridge on the reception side by the second UE.

SUMMARY

Some exemplary embodiments include a method of configuring time sensitive communications (TSC). The method includes monitoring, by a user plane function (UPF), a source and destination of packets in a first protocol data unit (PDU) session of a first user equipment (UE), wherein the packets are communicated through a time sensitive network (TSN), monitoring, by the UPF, a source and destination of packets in a second PDU session of a second UE, wherein the packets are communicated through the time sensitive network (TSN), pairing a first device side TSN translator (DS-TT) port of the first UE with a second DS-TT port of the second UE when the first PDU session and the second PDU session are served by the same UPF, wherein the pairing is based on the monitoring of the first and second PDU sessions and when the first DS-TT and second DS-TT ports are paired, communicating the packets between the first UE and the second UE in a UE-UE communication without traversing the TSN.

Other exemplary embodiments provide a system having one or more network components configured to provide a fifth-generation core network (5GC) providing 5G radio access network (RAN) services to a first user equipment (UE) and a second UE in a time-sensitive communications (TSC) network (TSN). The one or more network components are configured to monitor, by a user plane function (UPF), a source and destination of packets in a first protocol data unit (PDU) session of the first UE, monitor, by the UPF, a source and destination of packets in a second PDU session of the second UE, pair a first device side TSN translator (DS-TT) port of the first UE with a second DS-TT port of the second UE when the first PDU session and the second PDU session are served by the same UPF, wherein the pairing is based on the monitoring of the first and second PDU sessions and when the first DS-TT and second DS-TT ports are paired, communicate the packets between the first UE and the second UE in a UE-UE communication without traversing the TSN.

Still further exemplary embodiments provide one or more non-transitory computer readable storage media that include a set of instructions. When the instructions are executed it causes one or more processors to perform operations. The operations include monitoring, by a user plane function (UPF), a source and destination of packets in a first protocol data unit (PDU) session of a first user equipment (UE), wherein the packets are communicated through a time sensitive network (TSN), monitoring, by the UPF, a source and destination of packets in a second PDU session of a second UE, wherein the packets are communicated through the time sensitive network (TSN), pairing a first device side TSN translator (DS-TT) port of the first UE with a second DS-TT port of the second UE when the first PDU session and the second PDU session are served by the same UPF, wherein the pairing is based on the monitoring of the first and second PDU sessions and when the first DS-TT and second DS-TT ports are paired, communicating the packets between the first UE and the second UE in a UE-UE communication without traversing the TSN.

DETAILED DESCRIPTION

The exemplary embodiments may be further understood with reference to the following description and the related appended drawings, wherein like elements are provided with the same reference numerals. The exemplary embodiments relate to a first user equipment (UE) sending a time sensitive communication (TSC) to a second UE. The exemplary embodiments allow for a user plane function (UPF) on the 5G new radio (NR) core network to bypass a time sensitive networking (TSN) network if the first UE and the second UE are served by the same UPF, thus saving time between transmission and reception of TSC data.

The exemplary embodiments are also described with regard to a network that includes 5G new radio NR radio access technology (RAT). However, in some embodiments, the network may also include a Long-Term Evolution (LTE) RAT even though the following description will focus primarily on 5G NR RAT. Although the UE can communicate with the network over both licensed and unlicensed bands of the spectrum, the following description will focus primarily on NR-U communications between the UE and the network.

A first issue with TSC data is that this data is always routed through the TSN network, regardless of whether or not the transmitting UE and the receiving UE are served by the same UPF. As a result, time, which is critical for TSC, is wasted.

According to exemplary embodiments, if the UPF determines that the device side TSN translator (DS-TT) port of the first UE (UE1) and the DS-TT of the second UE (UE2) are served by the same UPF, the UPF can pair these two DS-TT ports instead of routing the communication through the TSN network.

According to further exemplary embodiments, a first UE1 may have the DS-TT port of a second UE2 hardcoded (e.g., via an update or stored in a memory device of the UE1) or the UE1 may know the details of the DS-TT port of the UE2 from previous TSC communications. In such an embodiment, the UE1 may send the port pairing to a session management function (SMF) of the 5G NR core network during a PDU session establishment.

According to further exemplary embodiments, the UPF maintains a database of all of the DS-TT ports that the UPF serves. The UPF shares this database with the SMF. When the UE1 establishes a PDU session with the SMF, the UE1 requests a port pairing for the UE2. In response, the SMF selects the port pair suitable for the UE selected by the UE1 (e.g., the UE2).

According to further exemplary embodiments, the SMF notifies an access and mobility management function (AMF) on the 5G NR core network of the DS-TT port database shared by the UPF with the SMF. The AMF broadcasts a list of available ports for pairing to all UEs served by the same UPF. When UE1 establishes a PDU session with the SMF, the UE1 may send the port pairing to the SMF based on the broadcasted list.

Figure 1:
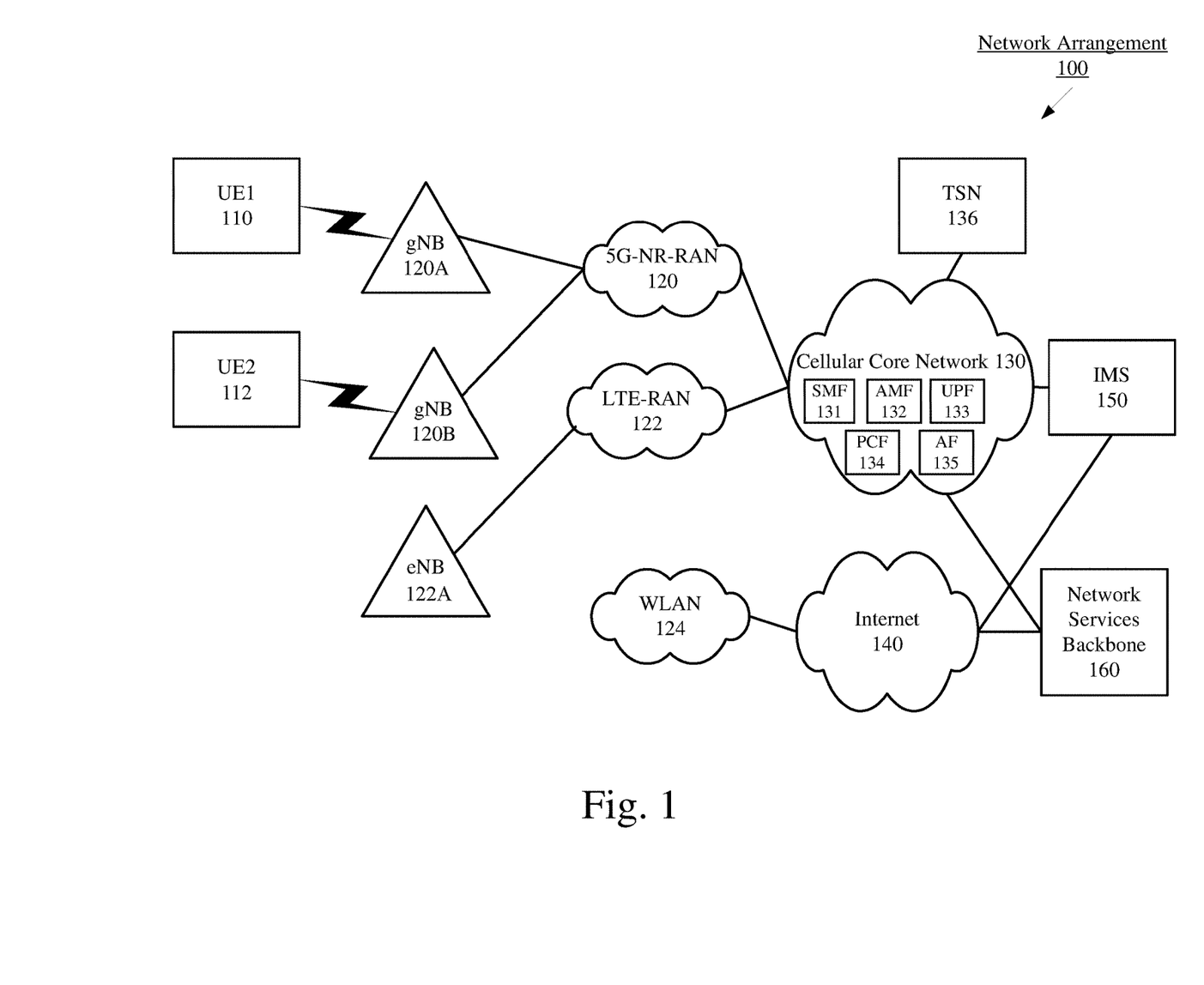
FIG. 1 shows an exemplary network arrangement according to various exemplary embodiments.

FIG. 1 shows an exemplary network arrangement 100 according to various exemplary embodiments. The exemplary network arrangement 100 includes a UE 110 and a UE 112. Although the following description focuses primarily on Industrial Internet of Things (IIoT) devices, those skilled in the art will understand that the UEs 110 and 112 may alternatively be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of two UEs 110 and 112 is merely provided for illustrative purposes.

The UEs 110 and 112 may be configured to communicate with one or more networks. In the example of the network configuration 100, the networks with which the UEs 110 and 112 may wirelessly communicate are a 5G New Radio (NR) radio access network (5G NR-RAN) 120, an LTE radio access network (LTE-RAN) 122 and a wireless local access network (WLAN) 124. However, it should be understood that the UEs 110 and 112 may also communicate with other types of networks and the UEs 110 and 112 may also communicate with networks over a wired connection. Therefore, the UEs 110 and 112 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110 and 112 may connect to the 5G NR-RAN 120 via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. During operation, the UEs 110 and 112 may be within range of a plurality of gNBs. Thus, either simultaneously or alternatively, the UEs 110 and 112 may also connect to the 5G NR-RAN 120 via the gNB 120B. Reference to two gNBs 120A, 120B is merely for illustrative purposes. The exemplary embodiments may apply to any appropriate number of gNBs. Further, the UEs 110 and 112 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UEs 110 and 112 to connect to the 5G NR-RAN 120. For example, as discussed above, the 5G NR-RAN 120 may be associated with a particular cellular provider where the UEs 110 and 112 and/or the users thereof has a contract and credential information (e.g., stored on a SIM card). Upon detecting the presence of the 5G NR-RAN 120, the UEs 110 and 112 may transmit the corresponding credential information to associate with the 5G NR-RAN 120. More specifically, the UEs 110 and 112 may associate with a specific base station (e.g., the gNB 120A of the 5G NR-RAN 120).

In addition to the networks 120 and 122 the network arrangement 100 also includes a cellular core network 130. The cellular core network 130 may be considered to be the interconnected set of components that manages the operation and traffic of the cellular network. In this example, the components include an SMF 131, an AMF 132, a UPF 133, a policy control function (PCF) 134, an application function (AF) 135, and a TSN network 136. However, an actual cellular core network may include various other components performing any of a variety of different functions.

The SMF 131 performs operations related to session management (SM), UE IP address allocation and management (including optional authorization), selection and control of user plane function; configuring traffic steering at the UPF 133 to route traffic to the proper destination, termination of interfaces toward policy control functions, controlling part of policy enforcement and quality of service (QoS), downlink data notification; initiating access network specific SM information sent via the AMF 132 to the 5G NR RAN 120; and determining session and service continuity (SSC) mode of a session. SM may refer to management of a PDU session. A PDU session may refer to a PDU connectivity service that provides or enables the exchange of PDUs between the UE 110 and the cellular core network 130. PDU sessions may be established upon request by the UEs 110 and 112. Reference to a single SMF 131 is merely for illustrative purposes; an actual network arrangement may include any appropriate number of SMFs, as will be discussed below.

The AMF 132 performs operations related to mobility management such as, but not limited to, paging, non-access stratum (NAS) management and registration procedure management between the UEs 110 and 112 and the cellular core network 130. Reference to a single AMF 132 is merely for illustrative purposes; an actual network arrangement may include any appropriate number of AMFs.

The UPF 133 performs operations related to intra-RAT and inter-RAT mobility, an external PDU session point of interconnect to the cellular core network 130, and a branching point to support multi-homed PDU sessions. The UPF 133 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., service data flow (SDF) to QoS flow mapping), transport level packet marking in the uplink and downlink, and downlink packet buffering and downlink data notification triggering. Reference to a single UPF 133 is merely for illustrative purposes; an actual network arrangement may include any appropriate number of UPFs.

The PCF 134 performs operations related to the control plane such as, but not limited to, managing policy rules for control plane functions including network slicing, roaming and mobility management. Reference to a single PCF 134 is merely for illustrative purposes; an actual network arrangement may include any appropriate number of PCFs.

The AF 135 performs operations related to application influence on traffic routing, access to a network cloud engine (NCE), and interaction with the policy framework for policy control. The NCE may be a mechanism that allows the cellular core network 130 and AF 135 to provide information to each other which may be used for edge computing implementations. In such implementations, the network operator and third-party services may be hosted close to the UEs 110 and 112 access point of attachment to achieve an efficient service delivery through reduced end-to-end latency and load on the transport network. For edge computing implementations, the cellular core network 130 may select a UPF 133 close to the UEs 110 and 112 and execute traffic steering from the UPF 133 to the network. This may be based on the UE subscription data, UE location, and information provided by the AF 135. In this way, the AF 135 may influence UPF (re)selection and traffic routing. Reference to a single AF 135 is merely for illustrative purposes; an actual network arrangement may include any appropriate number of AFs.

The TSN network 136 performs operations related to the guaranteeing of a minimum latency for critical data, reserving resources for critical traffic (e.g., TSC data), and configuring 5G system (5GS) bridge parameters for TSC data.

Figure 2:
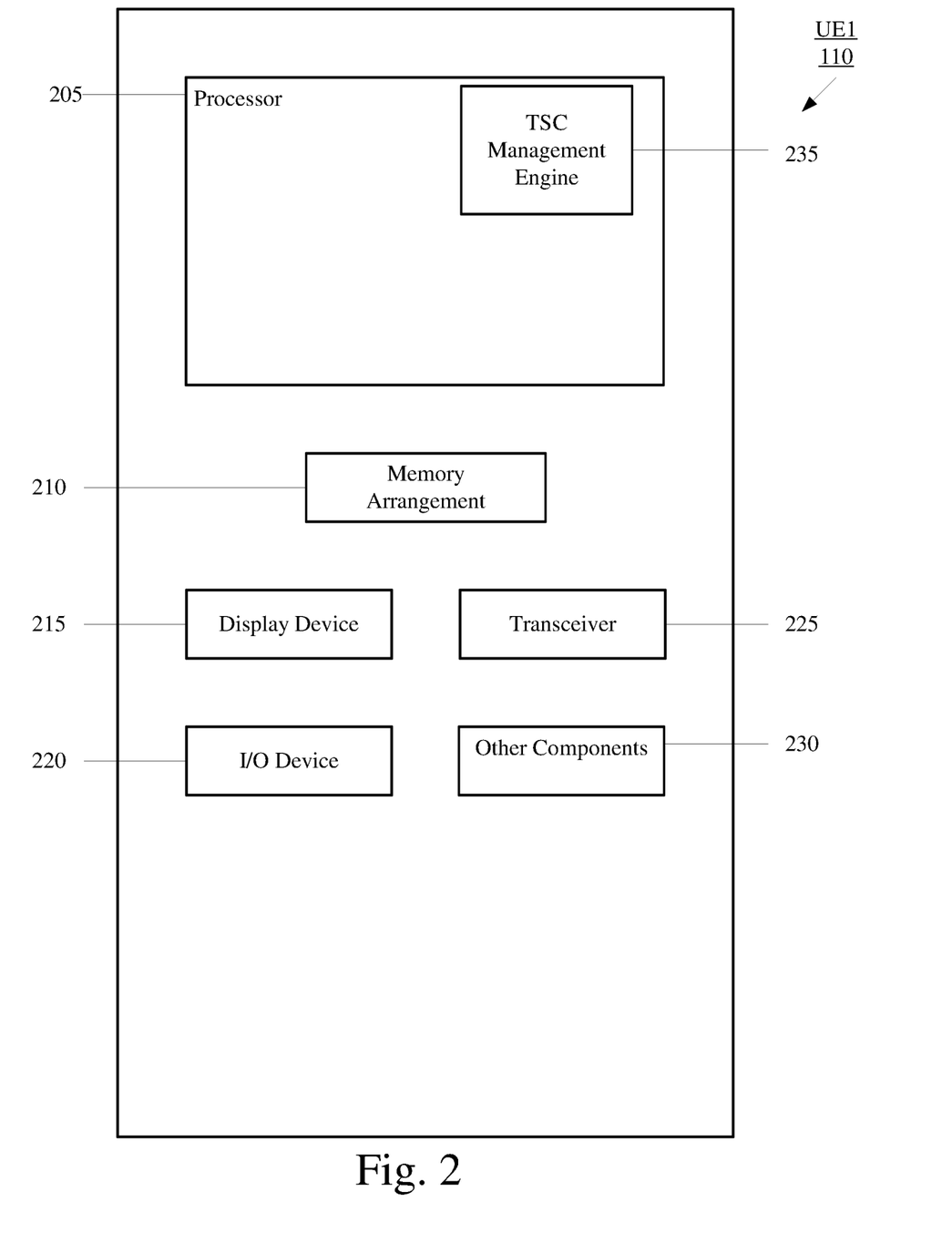
FIG. 2 shows an exemplary UE according to various exemplary embodiments.

FIG. 2 shows an exemplary UE 110 according to various exemplary embodiments. FIG. 2 will describe exemplary UE 110 but it should be understood that the description may apply equally to the UE 112. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a TSC management engine 235. The TSC management engine 235 may perform various operations related to configuring TSC data for transmission, establishing a PDU session with an SMF, and processing received TSC data.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
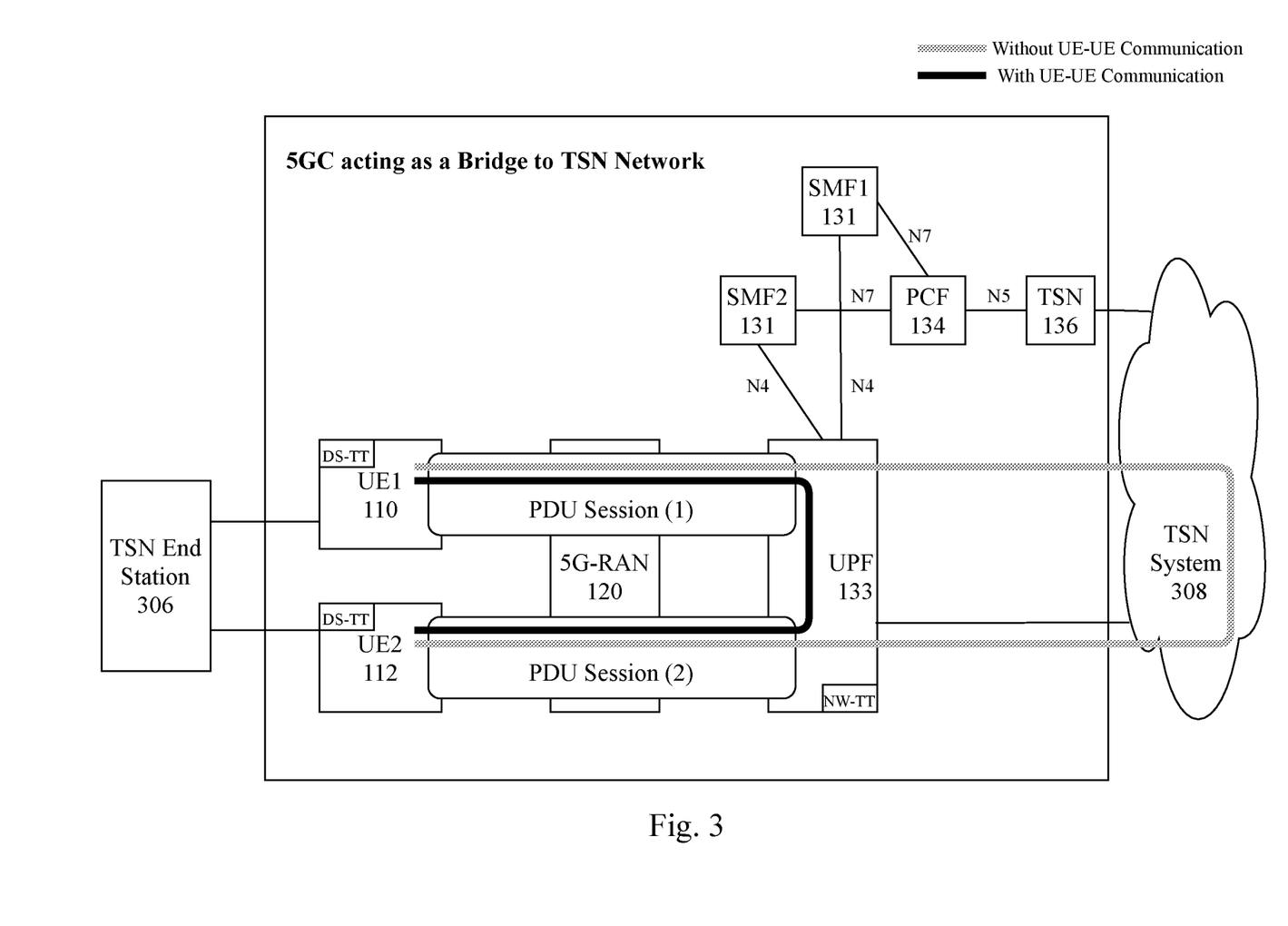
FIG. 3 shows an exemplary network architecture for TSC data exchange according to various exemplary embodiments.

FIG. 3 shows an exemplary network architecture 300 for TSC data exchange between a first UE (UE1 301) and a second UE (UE2 302) according to various exemplary embodiments. As illustrated in FIG. 3, to send TSC data from one UE (e.g., UE1 301) to another UE (e.g., UE2 302), each UE establishes a PDU session (PDU Session 1 and PDU Session 2) with a UPF 304. As shown in FIG. 3, both UEs are electronically coupled to the same TSN end station 306. The TSN end station 306 may be, for example, an industrial facility where each UE is communicatively coupled to an industrial device. Currently, TSC data is routed from the transmitting UE (UE1 301 or UE2 302), to the UPF 304, to a TSN System 308, back to the same UPF 304, and to the receiving UE (UE2 302 or UE1 301). This routing is labeled in FIG. 3 as "without UE-UE communication."

As will be discussed below, however, according to the exemplary embodiments, because the UPF 304 serves both PDU sessions, the UPF 304 may bypass the TSN system 308 and perform the port pairing of the DS-TT ports of the two UEs. This routing is labeled in FIG. 3 as "with UE-UE communication." As a result, time is saved in sending of TSC data from one UE to another UE (UE-UE communication).

The following exemplary embodiments include various signaling diagrams that include messages that are exchanged between the various components and/or functions. These messages may be provided with a message name and/or an information element (IE) name. It should be understood that these names are only exemplary and that messages and/or IEs that provide the same information may have different names in different embodiments. Those skilled in the art will understand the various functionalities and/or information provided in each message and may apply this to other embodiments.

Figure 4:
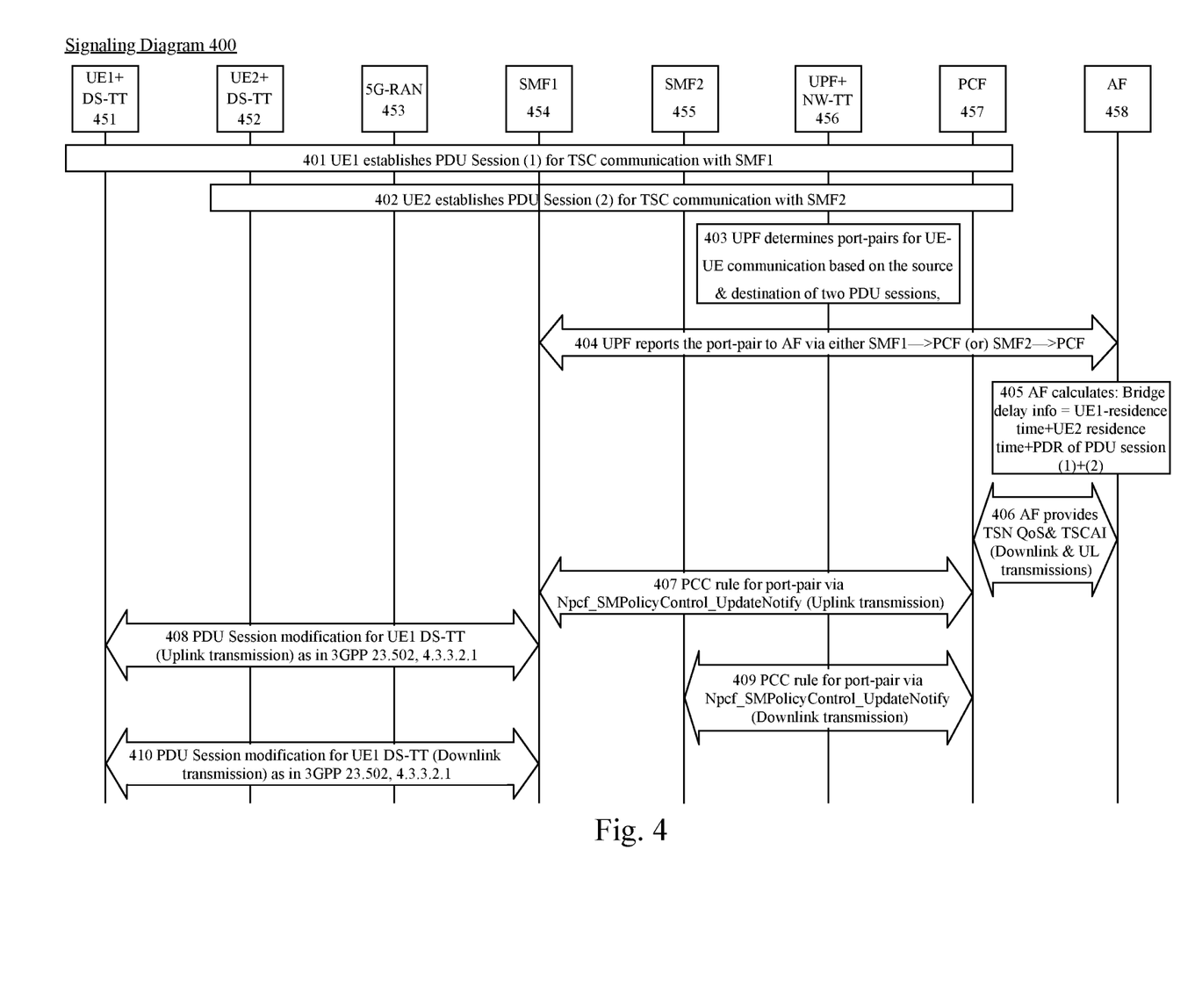
FIG. 4 shows a signaling diagram for UE to UE communications according to various exemplary embodiments.

FIG. 4 shows a signaling diagram for UE to UE communications according to various exemplary embodiments. At 401, a first UE (UE1 451) having a first DS-TT port establishes a PDU session (1) with a first SMF (SMF1 454). At 402, a second UE (UE2 452) having a second DS-TT port establishes a PDU session (2) with a second SMF (SMF2 455). It is determined here that both PDU sessions are served by the same UPF 456 having a network side TT (NW-TT).

As such, at 403, the UPF 456 determines, based on the source and destination MAC addresses, that the traffic flows between the DS-TT port of UE1 451 and the DS-TT port of UE2 452. Thus the two ports are capable of being paired. In some embodiments, the UPF 456 assigns port numbers to the DS-TT port of UE1 451 and the DS-TT port of UE2 452 during the respective PDU sessions. The UPF 456 may maintain a database table with all of the port numbers assigned to the different DS-TT that the PDU serves. The UPF 456 will know the source and destination port numbers from the header of an ethernet packet. As a result, the UPF 456 determines that two UEs can be paired for UE-UE communication based on the source and destination port numbers present in the header.

At 404, the UPF 456 conveys the port-pair to an AF 458 via the SMF (SMF1 454 or SMF2 455) and a PCF 457. The AF 458 may be a TSN AF. At 405, the AF 458 calculates the bridge delay information as follows:

Bridge delay information=[UE1-DT-TT residence time+PDB of PDU session (1)]+[UE2-DS-TT residence time+PDB of PDU session (2)]

where the residence time is the time it takes for a data packet to travel from a DS-TT to its corresponding UE; and PDB is the packet delay budget of a PDU session.

At 406, based on the calculated bridge delay information, the AF 458 evaluates the QoS for the UL and DL links for UE-UE communication and shares this information with the PCF 457 along with the TSC assistance information (TSCAI) and requests that the PCF 457 create corresponding policy control and charging (PCC) rules for the SMF to use for the PDU sessions via, for example, an Npcf_Policy Authorization service. TSCAI is information that describes TSC traffic characteristics.

At 407, the PCF 457 creates PCC rules for uplink transmission and updates the SMF1 454 of PDU session (1) via, for example, a Npcf_SMPolicyControl_UpdateNotify procedure. At 408, the SMF1 454 modifies the PDU session (1) with the updated QoS being sent to the DS-TT of UE1 451. As shown in FIG. 4, the PDU session modification to accommodate the UE to UE communications may be performed in the same manner as the PDU session modification is described with respect to 3GPP TS 23.502, Section 4.3.3.2-1. Those skilled in the art will understand that the PDU Session modification described in the 3GPP standard is for a different purpose than the PDU Session modification being described herein. However, the procedure for modifying the session may be the same.

At 409, the PCF 457 creates PCC rules for downlink transmission and updates the SMF2 455 of PDU session (2) via a Npcf_SMPolicyControl_UpdateNotify procedure. At 410, the SMF2 455 modifies the PDU session (2) with the updated QoS being sent to the DS-TT of UE1 452. Again, the PDU session modification may be performed in the same manner as the PDU session modification is described with respect to 3GPP TS 23.502, Section 4.3.3.2-1. In some embodiments, the PCF 457 may alternatively use the existing TSC configuration provided by the AF 458 during the PDU session establishment procedure and provide the updated PCC Rules and TSCAI to the SMF 455 (for UE-UE Communication) via, for example, the Npcf_SMPolicyControl_UpdateNotify procedure.

Figure 5:
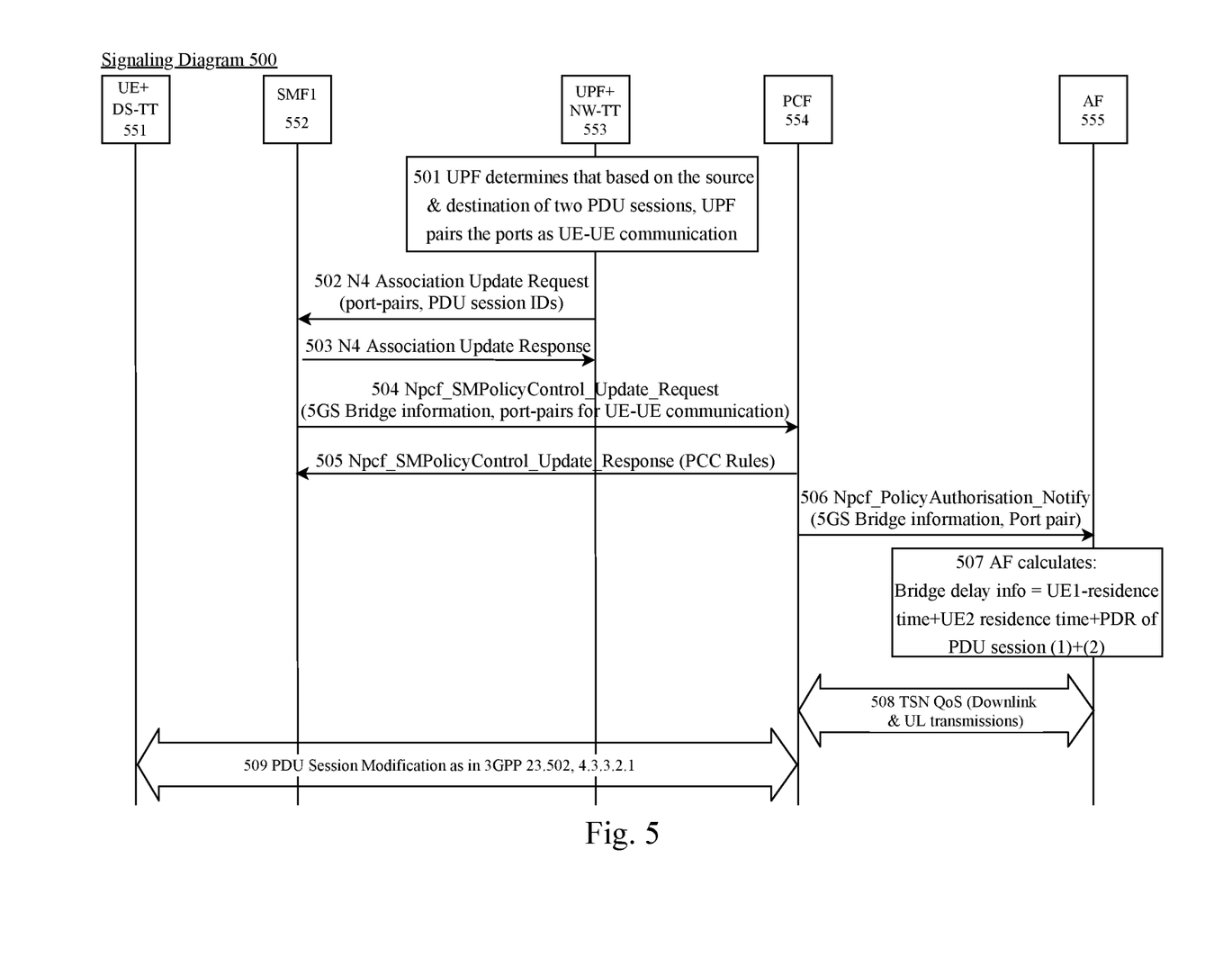
FIG. 5 shows a signaling diagram for a user plane function (UPF) reporting a port pair to an application function (AF) according to various exemplary embodiments.

FIG. 5 shows a first exemplary signaling diagram for the UPF reporting a port pair to the AF according to various exemplary embodiments. At 501, a UPF 553 determines, based on the source and destination MAC addresses in packets, that traffic flows between the DS-TT port of a first UE (UE1 551) and a DS-TT port of a second UE (not shown in FIG. 5). Thus, because both UEs are connected to the same UPF, the two ports may be paired.

At 502, the UPF 553 reports the port-pair to an SMF 552 via, for example, the N4 Association Update Request. The UPF 553 includes the port-pairs and the PDU session IDs of both UEs to be converted to UE-UE communication.

At 503, the SMF 552 sends an acknowledgment to the UPF 553 via, for example, the N4 Association Update Response. At 504, the SMF 552 requests that a PCF 554 update the PDU session by providing new PCC rules suitable for UE-UE communication. The SMF 552 also provides the port-pairs along with the 5GS bridge information. The 5GS Bridge Information may be considered the information elements (IEs) that are received by the SMF 134 from the UE and the UPF during the PDU session establishment. The SMF encapsulates these IEs and this may be considered 5GS bridge information. At 505, the PCF 554 provides the PCC rules for the PDU sessions with the QoS configuration for uplink and downlink transmissions along with the TSCAI.

At 506, if the PCF 554 does not have the PCC rules for UE-UE communication, the PCF 554 could request that the AF 555 provide the QoS rules and TSCAI via, for example, Npcf_PolicyAuthorisation_Notify by including the port-pairs and 5GS Bridge Information in the request.

At 507, the AF 555 calculates the Bridge delay information using the Bridge delay information equation described above with respect to FIG. 4. At 508, based on the calculated bridge delay information, the AF 555 evaluates the QoS for the UL and DL links for UE-UE communication and shares this information with the PCF 554. At 509, the PCF 554 modifies the PDU session with the updated QoS being sent to the DS-TT of UE1 551.

Figure 6:
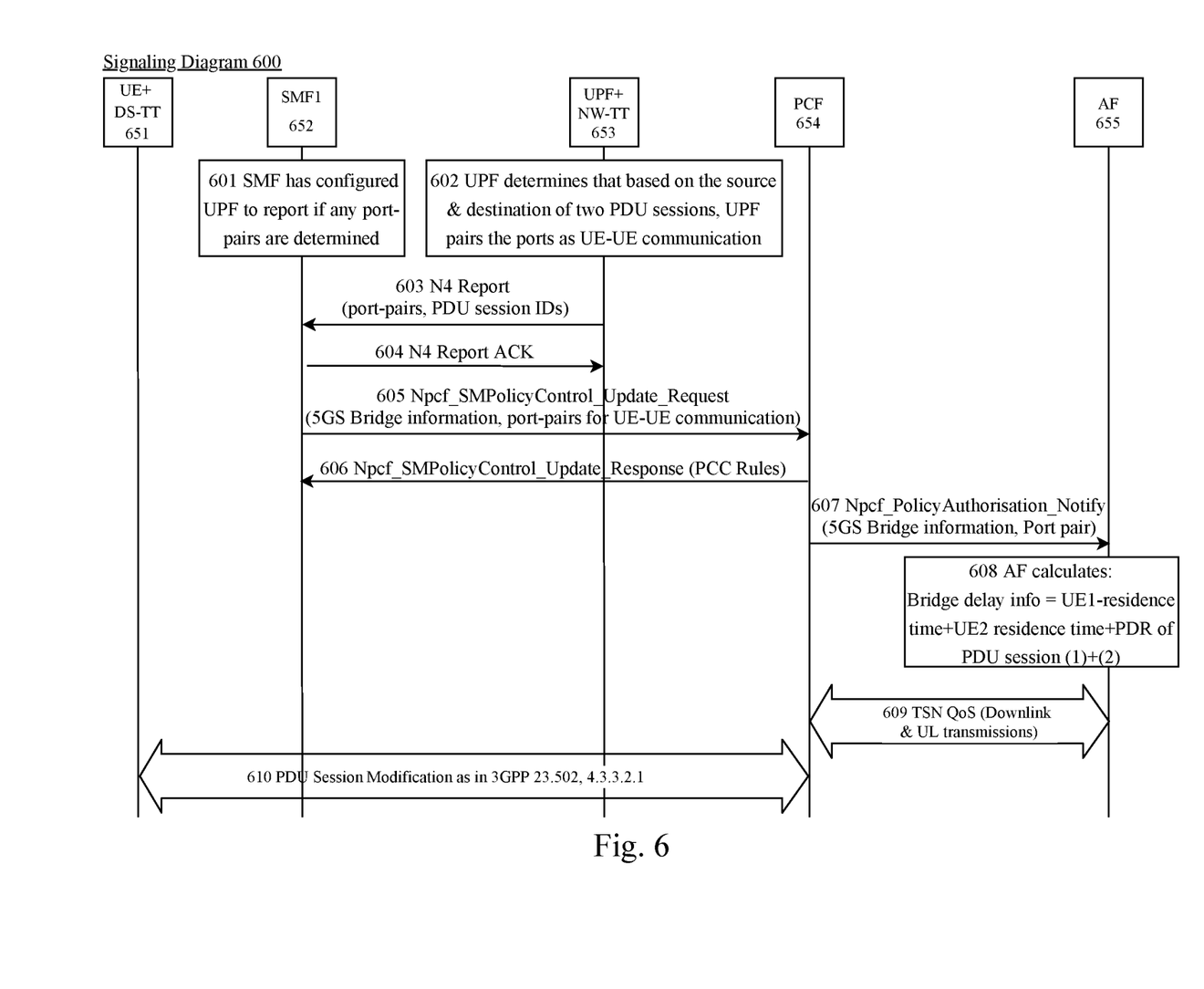
FIG. 6 shows a second exemplary signaling diagram for the UPF reporting a port pair to the AF according to various exemplary embodiments.

FIG. 6 shows a second exemplary signaling diagram 600 for the UPF reporting a port pair to the AF according to various exemplary embodiments. The embodiment of FIG. 6 is substantially similar to that of FIG. 5 except that in FIG. 6, at 601, the SMF 652 configures the UPF 653 to report any port pairs determined by the UPF 653. At 602, the UPF 653 determines, based on the source and destination MAC addresses, that the traffic flows between the DS-TT of UE1 and the DS-TT port of UE2. Thus, the two ports may be paired. At 603, the UPF 653 communicates the port-pair to the SMF 652 via, for example, the N4 Report. The UPF 653 includes the port-pairs and the PDU session IDs of the UEs to be converted to UE-UE communication. At 604, the SMF 652 sends an acknowledgment to the UPF 653 via an N4 report ACK. Because 605-610 are identical to 504-509 described above, a description of these communications is omitted here.

Figure 7:
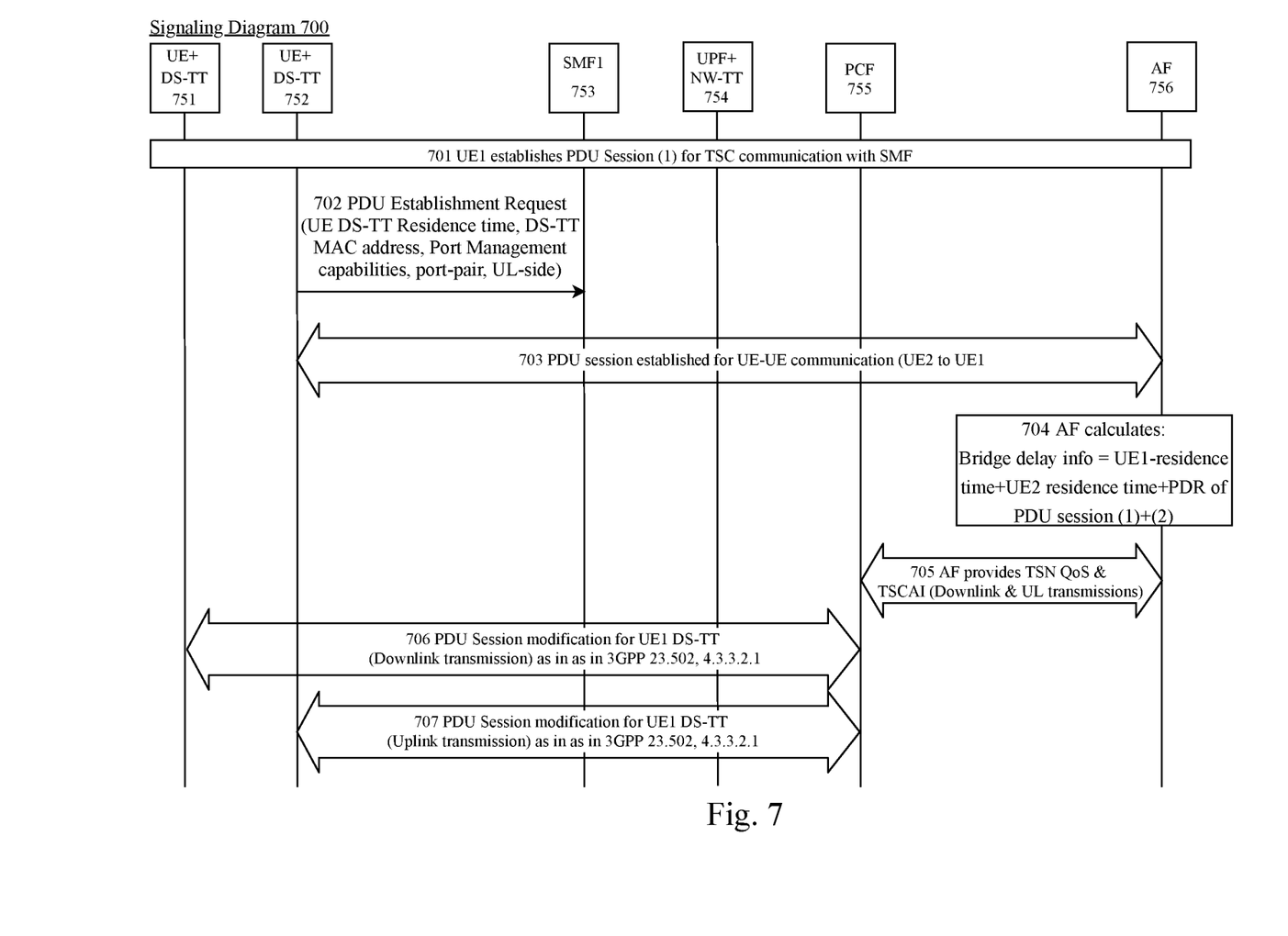
FIG. 7 shows a signaling diagram for UE-initiated port pairing according to various exemplary embodiments.

FIG. 7 shows a signaling diagram 700 for UE-initiated port pairing according to various exemplary embodiments. At 701, a first UE (UE1 751) establishes a PDU session (1) with a SMF 753. At 702, a second UE (UE2 752) establishes a PDU session (2) with the SMF 753. In some embodiments, the UE2 752 also includes the port-pair and the direction of the data transfer in the UE-UE communication in the PDU Session (2) establishment request. In this example, UE2 752 is the UL side. In some embodiments, port details of UE1 751 may be hard-coded onto the memory of the UE2 752 (e.g., through a software update or pre-programmed onto the memory of UE2). In some embodiments, the UE2 752 may alternatively know the port details of the DS-TT of the UE1 751 from prior knowledge (e.g., UE1 and UE2 have previously been in a UE-UE communication).

At 703, a PDU session is established for UE2. The SMF 753 selects the UPF 754 based on the port-pair details shared by UE2 752. That is, the SMF 753 will select the UPF that serves PDU session (1) of the UE1 751. In some embodiments, if the SMF 753 is not able to find the UPF that serves the UE identified in the port-pair details shared by the UE2 752, the SMF 753 may request that an AF 756 resolve the UPF details for the DS-TT port of the UE1 751.

At 704, the AF 756 calculates the bridge delay information using the bridge delay information equation described above with respect to FIG. 4. At 705, the AF 756 evaluates the QoS for the UL and DL links for UE-UE communication along with the TSCAI. The AF 756 also requests that the PCF 755 create corresponding PCC rules for the SMF 753 to use for the PDU sessions (1 and 2) via Npcf_Policy Authorization service. At 706, the SMF 753 modifies the PDU session (1) with the updated QoS being sent to the DS-TT of UE1 751. At 707, similar to 706, the PDU session (2) is modified for downlink transmission with the QoS.

Figure 8:
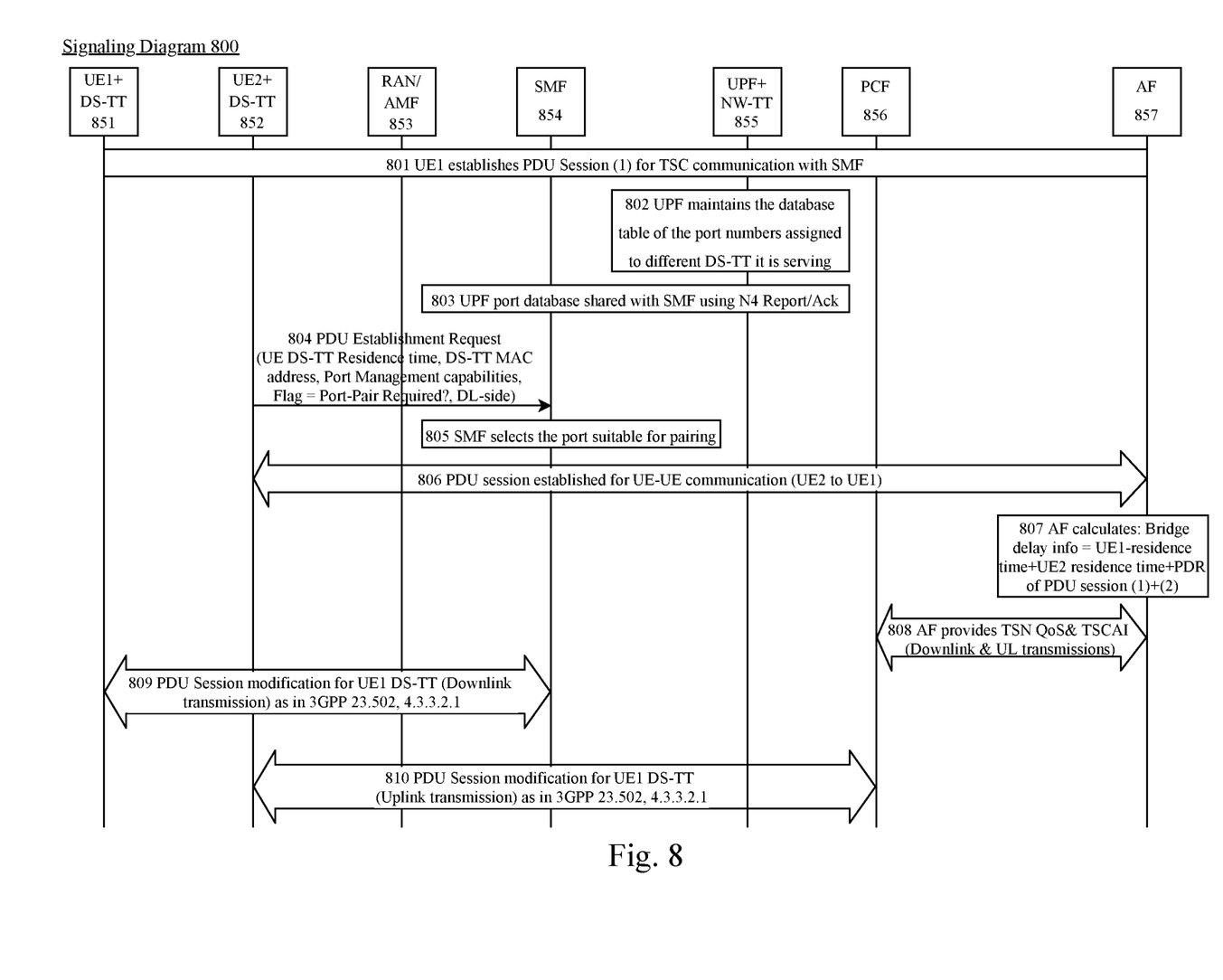
FIG. 8 shows a signaling diagram for SMF port pairing in response to UE request according to various exemplary embodiments.

FIG. 8 shows a signaling diagram for SMF port pairing in response to UE request according to various exemplary embodiments. At 801, a DS-TT of a first UE (UE1 851) establishes a PDU session (1) with an SMF 854. At 802, a UPF 855 maintains a database table of the port numbers assigned to different DS-TTs which the UPF 855 serves. At 803, the UPF 855 shares the DS-TT database table with the SMF 854 via N4 Report/Ack SM messages. At 804, a DS-TT of a second UE (UE2 852) initiates a PDU session (2) establishment request with the SMF 854. In the request, the UE2 852 includes a flag which indicates to the SMF 854 that the UE2 852 seeks a port-pair to transfer data via UE-UE communication. In this example, UE2 is the DL side.

At 805, the SMF 854 selects the port suitable for paring for the requested UE. At 806, a PDU session is established for the UE2 852. The SMF 854 selects the UPF 855 based on the port-pair details shared by UE2. That is, the SMF 854 selects the UPF which is serving PDU session (1). In some embodiments, if the SMF 854 is not able to able to find the UPF based on the port-pair details shared by the UE2 852, the SMF 854 would request that an AF 857 resolve the UPF details for the DS-TT of the UE1 851.

At 807, the AF 857 calculates the Bridge delay information using the Bridge delay information equation described above with respect to FIG. 4. At 808, the AF 857 evaluates the QoS for the UL and DL links for UE-UE communication along with the TSCAI. The AF 857 also requests that the PCF 856 create corresponding PCC rules for the SMF 854 to use for the PDU sessions via Npcf_Policy Authorization service. At 809, the SMF 854 modifies the PDU session (1) with the updated QoS being sent to the DS-TT of the UE1 851. At 810, similar to 809, the PDU session (2) is modified for downlink transmission with the QoS.

Figure 9:
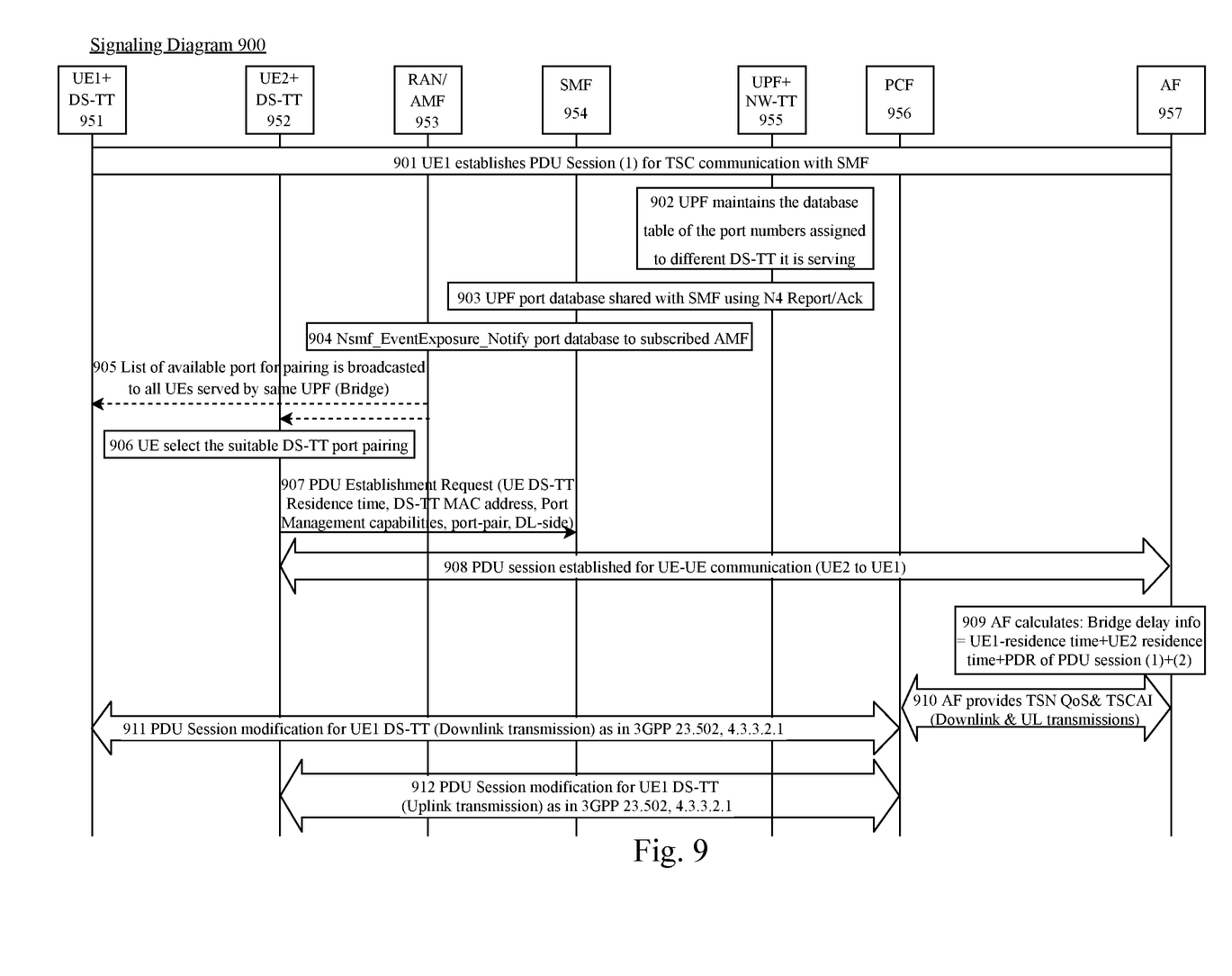
FIG. 9 shows a signaling diagram for AMF/SMF broadcasting of available port pairing for UE selection according to various exemplary embodiments.

FIG. 9 shows a signaling diagram for AMF/SMF broadcasting of available port pairing for UE selection according to various exemplary embodiments. At 901, a DS-TT of a first UE (UE1 951) establishes a PDU session (1) with an SMF 954. At 902, a UPF 955 maintains a database table of the port numbers assigned to different DS-TTs which the UPF 955 serves. At 903, the UPF 955 shares the DS-TT database table with the SMF 954 via N4 Report/Ack SM messages.

At 904, the SMF 954 notifies a subscribed AMF 953 of the DS-TT database table. At 905, the UPF 955 broadcasts a list of available port for pairing to all UEs served by the UPF (5GS Bridge). At 906, a second UE (UE2 952) selects a suitable DS-TT port for pairing from the broadcasted list. At 907, a DS-TT of the UE2 952 establishes a PDU session (2) with the SMF 954. In the PDU session establishment request, the UE2 952 also includes the port-pair and the direction of the data transfer in the UE-UE communication. In this example, the UE2 952 is on the DL side.

At 908, a PDU session (2) is established for the UE2 952. The SMF 954 selects the UPF 955 based on the port-pair details shared by the UE2 952. That is, the SMF 954 will select the UPF 955 that serves PDU session (1) of the UE1 951. In some embodiments, if the SMF 954 is not able to able to find the UPF based on the port-pair details shared by the UE2 952, the SMF 954 may request that the AF 957 resolve the UPF details for the DS-TT of the UE1 951.

At 909, the AF 957 calculates the bridge delay information using the Bridge delay information equation described above with respect to FIG. 4. At 910, the AF 957 evaluates the QoS for the UL and DL links for UE-UE communication along with the TSCAI. The AF 957 requests that the PCF 956 create corresponding PCC rules for the SMF 954 to use for the PDU sessions via Npcf_Policy Authorization service. At 911, the SMF 954 modifies the PDU session (1) with the updated QoS being sent to the DS-TT of the UE1 951. At 912, similar to 911, the PDU session (2) is modified for downlink transmission with the QoS.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method of configuring time sensitive communications (TSC), comprising:
    monitoring, by a user plane function (UPF), a source and destination of packets in a first protocol data unit (PDU) session of a first user equipment (UE), wherein the packets are communicated through a time sensitive network (TSN);
    monitoring, by the UPF, a source and destination of packets in a second PDU session of a second UE, wherein the packets are communicated through the time sensitive network (TSN);
    pairing a first device side TSN translator (DS-TT) port of the first UE with a second DS-TT port of the second UE when the first PDU session and the second PDU session are served by the same UPF, wherein the pairing is based on the monitoring of the first and second PDU sessions;
    assigning, by the UPF, port numbers to all DS-TTs served by the UPF, wherein the UPF maintains a database of the port numbers;
    sharing, by the UPF, the database of the port numbers with a session management function (SMF),
        wherein the second UE includes a flag in a request for the second PDU session,
        wherein the flag indicates to the SMF that the second UE seeks a port pair to transfer data via UE-UE communication, and
        wherein the SMF pairs the first DS-TT port and the second DS-TT port; and
    when the first DS-TT and second DS-TT ports are paired, communicating the packets between the first UE and the second UE in a UE-UE communication without traversing the TSN.

2. The method of claim 1, further comprising:
    reporting, by the UPF to an application function (AF), the pairing of the first DS-TT and second DS-TT ports.

3. The method of claim 2, further comprising:
    determining, by the AF, total bridge delay information for the first PDU session and the second PDU session, wherein the total bridge delay information comprises a sum of a first residence time between the first DS-TT and the first UE, a first packet delay budget (PDB) of the first PDU session, a second residence time between the second DS-TT and the second UE, and a second PDB of the second PDU session; and
    determining, by the AF, a quality of service (QoS) for uplink and downlink links of the UE-UE communication based on the total bridge delay information.

4. The method of claim 3, further comprising:
    reporting, by the AF to a policy control function (PCF), the QoS for the uplink and downlink links of the UE-UE communication; and
    reporting, by the AF to the PCF, TSC assistance information (TSCAI).

5. The method of claim 1, wherein pairing of the first DS-TT port and the second DS-TT port is based on a source port number and a destination port number.

6. The method of claim 1, further comprising:
    sharing, by the SMF, the database of the port numbers with an access and mobility management function (AMF);
    broadcasting, by the AMF, a list of available port numbers for pairing to all UEs served by the same UPF, wherein one of the first UE or second UE selects a port number for the pairing.

7. The method of claim 1, wherein the second UE indicates a desired port pair and a direction of data transfer when requesting the second PDU session.

8. The method of claim 7, wherein details of the first DS-TT port are hard-coded on the second UE.

9. The method of claim 7, wherein details of the first DS-TT port are stored on the second UE from a previous UE-UE communication with the first UE.

10. One or more non-transitory computer readable storage media comprising a set of instructions that when executed cause one or more processors to perform operations comprising:
    monitoring, by a user plane function (UPF), a source and destination of packets in a first protocol data unit (PDU) session of a first user equipment (UE), wherein the packets are communicated through a time sensitive network (TSN);
    monitoring, by the UPF, a source and destination of packets in a second PDU session of a second UE, wherein the packets are communicated through the time sensitive network (TSN);
    pairing a first device side TSN translator (DS-TT) port of the first UE with a second DS-TT port of the second UE when the first PDU session and the second PDU session are served by the same UPF, wherein the pairing is based on the monitoring of the first and second PDU sessions;
    assigning, by the UPF, port numbers to all DS-TTs served by the UPF, wherein the UPF maintains a database of the port numbers;
    sharing, by the UPF, the database of the port numbers with a session management function (SMF),
        wherein the second UE includes a flag in a request for the second PDU session,
        wherein the flag indicates to the SMF that the second UE seeks a port pair to transfer data via UE-UE communication, and
        wherein the SMF pairs the first DS-TT port and the second DS-TT port; and
    when the first DS-TT and second DS-TT ports are paired, communicating the packets between the first UE and the second UE in a UE-UE communication without traversing the TSN.

11. The computer readable storage media of claim 10, wherein the operations further comprise:
    sharing, by the UPF, the database of the port numbers with a session management function (SMF),
    sharing, by the SMF, the database of the port numbers with an access and mobility management function (AMF); and
    broadcasting, by the AMF, a list of available port numbers for pairing to all UEs served by the same UPF, wherein one of the first UE or second UE selects a port number for the pairing.

12. The computer readable storage media of claim 10, wherein the operations further comprise:
    reporting, by the UPF to an application function (AF), the pairing of the first DS-TT and second DS-TT ports.

13. The computer readable storage media of claim 12, wherein the operations further comprise:
    determining, by the AF, total bridge delay information for the first PDU session and the second PDU session, wherein the total bridge delay information comprises a sum of a first residence time between the first DS-TT and the first UE, a first packet delay budget (PDB) of the first PDU session, a second residence time between the second DS-TT and the second UE, and a second PDB of the second PDU session; and determining, by the AF, a quality of service (QoS) for uplink and downlink links of the UE-UE communication based on the total bridge delay information.

14. The computer readable storage media of claim 13, wherein the operations further comprise:

reporting, by the AF to a policy control function (PCF), the QoS for the uplink and downlink links of the UE-UE communication; and reporting, by the AF to the PCF, TSC assistance information (TSCAI).

15. The computer readable storage media of claim 10, wherein pairing of the first DS-TT port and the second DS-TT port is based on a source port number and a destination port number.

16. The computer readable storage media of claim 10, wherein the operations further comprise:

sharing, by the SMF, the database of the port numbers with an access and mobility management function (AMF);

broadcasting, by the AMF, a list of available port numbers for pairing to all UEs served by the same UPF, wherein one of the first UE or second UE selects a port number for the pairing.

17. The computer readable storage media of claim 10, wherein the second UE indicates a desired port pair and a direction of data transfer when requesting the second PDU session.

18. The computer readable storage media of claim 17, wherein details of the first DS-TT port are hard-coded on the second UE.

19. The computer readable storage media of claim 17, wherein details of the first DS-TT port are stored on the second UE from a previous UE-UE communication with the first UE.

20. One or more processors configured to perform operations comprising:

monitoring, by a user plane function (UPF), a source and destination of packets in a first protocol data unit (PDU) session of a first user equipment (UE), wherein the packets are communicated through a time sensitive network (TSN);

monitoring, by the UPF, a source and destination of packets in a second PDU session of a second UE, wherein the packets are communicated through the time sensitive network (TSN);

pairing a first device side TSN translator (DS-TT) port of the first UE with a second DS-TT port of the second UE when the first PDU session and the second PDU session are served by the same UPF, wherein the pairing is based on the monitoring of the first and second PDU sessions;

assigning, by the UPF, port numbers to all DS-TTs served by the UPF, wherein the UPF maintains a database of the port numbers;

sharing, by the UPF, the database of the port numbers with a session management function (SMF), wherein the second UE includes a flag in a request for the second PDU session, wherein the flag indicates to the SMF that the second UE seeks a port pair to transfer data via UE-UE communication, and wherein the SMF pairs the first DS-TT port and the second DS-TT port; and when the first DS-TT and second DS-TT ports are paired, communicating the packets between the first UE and the second UE in a UE-UE communication without traversing the TSN.

* * * * *